US008376860B1

(12) United States Patent
Boutin

(10) Patent No.: US 8,376,860 B1
(45) Date of Patent: Feb. 19, 2013

(54) GAME FLICZ SYSTEMS

(76) Inventor: Jari Boutin, Calgary (CA)

(*) Notice: Subject to any disclaimer, the term of this patent is extended or adjusted under 35 U.S.C. 154(b) by 0 days.

(21) Appl. No.: 13/337,097

(22) Filed: Dec. 24, 2011

Related U.S. Application Data

(60) Provisional application No. 61/511,308, filed on Jul. 25, 2011.

(51) Int. Cl.
A63F 9/24 (2006.01)
(52) U.S. Cl. .................................................. 463/42
(58) Field of Classification Search .............. 463/31–42; 715/706; 345/156
See application file for complete search history.

(56) References Cited

U.S. PATENT DOCUMENTS

| 6,055,563 A | 4/2000 | Endo et al. | |
| 6,557,041 B2 | 4/2003 | Mallart | |
| 7,208,669 B2 | 4/2007 | Wells et al. | |
| 8,100,766 B2* | 1/2012 | Leblanc et al. | 463/31 |
| 8,172,683 B2* | 5/2012 | Kelly | 463/42 |
| 2006/0080702 A1* | 4/2006 | Diez et al. | 725/30 |
| 2007/0275705 A1* | 11/2007 | Lau et al. | 455/414.1 |
| 2009/0119736 A1 | 5/2009 | Perlman et al. | |
| 2011/0157196 A1 | 6/2011 | Nave et al. | |

* cited by examiner

Primary Examiner — Masud Ahmed
(74) Attorney, Agent, or Firm — RG Patent Consulting LLC; Rachel Gilboy

(57) ABSTRACT

A membership-based video game delivery system for securely providing an internet-based video game catalog to paying video game playing members for immediate downloading availability. A video game playing user may log into a video game database hosted on a central server via the user's video gaming console. Once the user is verified by an authentication and security program, the user may browse, select, download, and play a wide variety of video games. The video game delivery system comprises user-configurable game accessibility and game playability parameters. The user may restrict, limit, and filter certain video games and may further configure real-time game update delivery options, such as enabling text messaging and email updates.

1 Claim, 6 Drawing Sheets

GAME FLICZ SYSTEMS

CROSS REFERENCE TO RELATED APPLICATION

The present application is related to and claims priority from prior provisional application Ser. No. 61/511,308, filed Jul. 25, 2011 which application is incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR 1.71(d).

BACKGROUND OF THE INVENTION

The following includes information that may be useful in understanding the present invention(s). It is not an admission that any of the information provided herein is prior art, or material, to the presently described or claimed inventions, or that any publication or document that is specifically or implicitly referenced is prior art.

1. Field of the Invention

The present invention relates generally to the field of video game delivery systems and more specifically relates to an improved streaming video game delivery system comprising user-friendly game filtering and parental restriction settings.

2. Description of the Related Art

Video games are played by both young and old gamers from all walks of life all across the globe. To appeal to the gaming masses, there are multitudes of gaming consoles a gamer may select from, each with unique characteristics that appeal to gamers of all types. Video games are constantly being released for each different type of console, providing countless hours of joy for those who enjoy playing video games.

Many individuals prefer to rent video games, as opposed to buying them, because many individuals will not play the game after they have made it to the end of the last level. Further, purchased games may tend to clutter the residence. It may be rather expensive, however, to pay fees on each individual game rented. Also, most rented video games have to be returned within a specific time. If the game is not returned in time, the renter might be subjected to a late fee. This may end up being costly and inconvenient. It is desired to have a more user-friendly format for renting games.

Various attempts have been made to solve the above-mentioned problems such as those found in U.S. Pat. No. 6,557,041 to Raoul Mallart; U.S. Pat. No. 7,208,669 to Robert V. Wells et al; U.S. Pat. No. 6,055,563 to Kaori Endo et al; and U.S. Pub. Nos. 2009/0119736 to Stephen G. Perlman et al; and 2011/0157196 to Itay Nave et al; and 2009/0198486 to Shih Chieh Chang. This prior art is representative of video gaming systems. None of the above inventions and patents, taken either singly or in combination, is seen to describe the invention as claimed.

Ideally, a video game delivery system should provide a user with instant access to a plurality of video game application files, and, yet would be customizable as to restrict access to mature-rated games by young children, operate reliably, and be manufactured at a modest expense. Thus, a need exists for a Game Flicz system for providing a central game delivery server which may host a secure database of video game application files for instant access by a verified user of the system via the user's gaming console, and to avoid the above-mentioned problems.

BRIEF SUMMARY OF THE INVENTION

In view of the foregoing disadvantages inherent in the known video game delivery art, the present invention provides an online database of video games hosted on a central secure server computer and accessible to a class of authenticated (and authorized) users for immediate download and enjoyment. The general purpose of the present invention, which will be described subsequently in greater detail, is to provide a novel database of video games accessible via a user's gaming console and comprising a plurality of user-configurable parameters such as to restrict access to mature-rated games, wherein the game files may be playable on the gaming console owned by a user.

In one embodiment of the present invention, the game delivery system may comprise a central game delivery server which may host a game database. The game database may comprise a plurality of video games of all different genres and playable on an array of user gaming consoles. Preferably, the user's gaming console comprises an internet connection for wirelessly connecting to the central game delivery server. Once the user is connected to the central game delivery server, a security application hosted on the central game delivery server may authenticate the user. Once the user is authenticated by the security application, the user may access the game database.

Once the user is validated by the security application and logs into the game database, the user may browse a catalog of video games, wherein each video game comprises at least one video game application file for executing the video game. The video game catalog may be filtered by genre, filtered by date of release of the video game, filtered by manufacturer, filtered by games recently played by the user, or by custom settings. Further, certain games may be restricted. The restriction may provide a manner for a parent or guardian of a young video gamer from accessing certain rated games.

Furthermore, Game Flicz system may provide a manner for the user to create and manage a user profile. Within the user profile, the user may configure game accessibility parameters and game playability parameters. Further, the user may manage the user's account, payments, friends, and notification options for new game updates. In one embodiment of the present invention, the user may opt to receive SMS text message to the user's mobile phone when a new video game is added to the game database. This may enable the user to be kept informed of all the latest releases. The user may also filter what games the user wishes to be notified on based on genre, manufacturer, or rating.

The present invention holds significant improvements and serves as a Game Flicz system. For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein. The features of the invention which are believed to be novel are particularly pointed out and distinctly claimed in the concluding portion of the specification. These and other features, aspects, and advantages of the present invention will become better understood with reference to the following drawings and detailed description.

BRIEF DESCRIPTION OF THE DRAWINGS

The figures which accompany the written portion of this specification illustrate embodiments and method(s) of use for the present invention, Game Flicz systems, constructed and operative according to the teachings of the present invention.

The various embodiments of the present invention will hereinafter be described in conjunction with the appended drawings, wherein like designations denote like elements.

DETAILED DESCRIPTION

Figure 1:
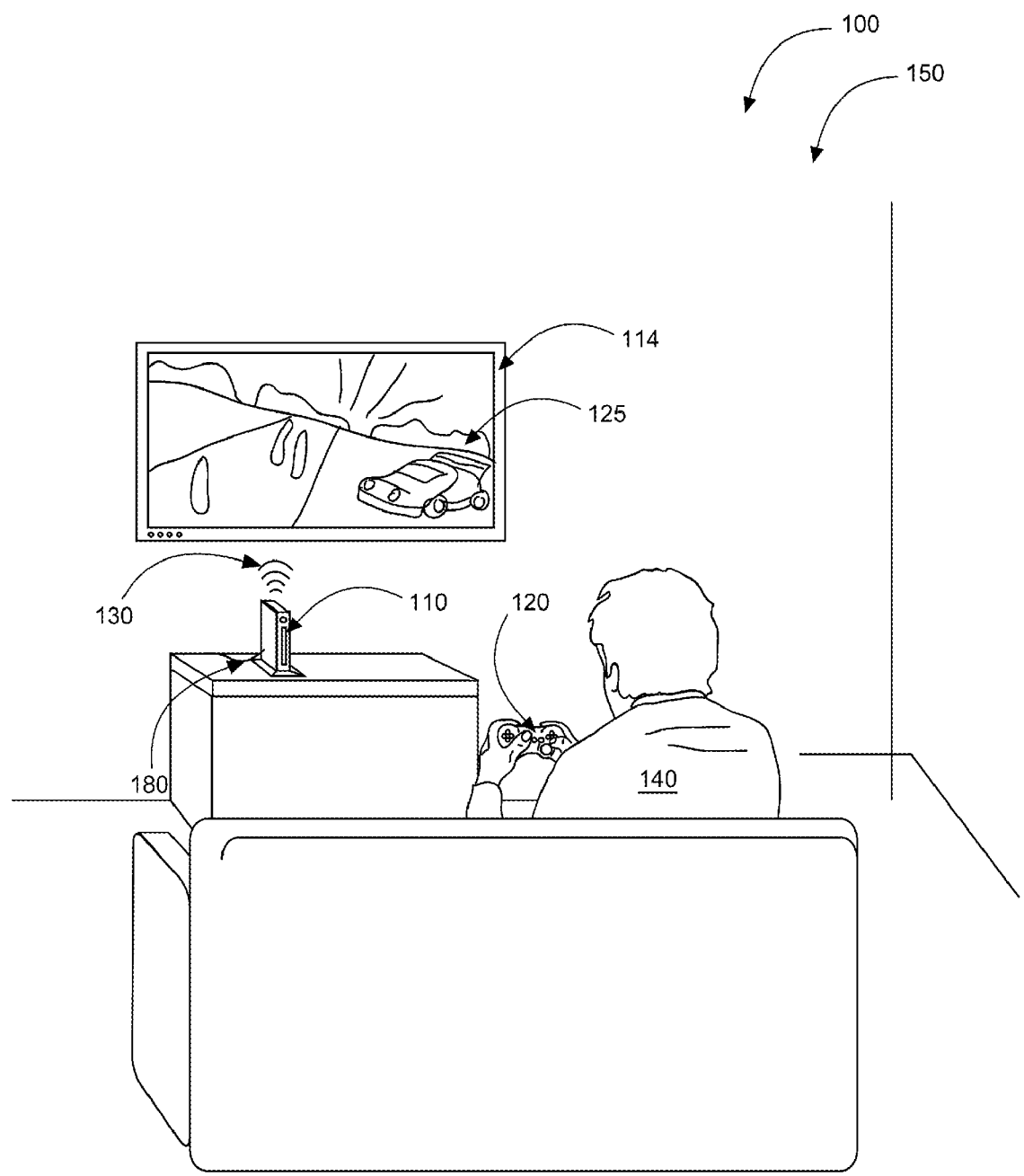
FIG. 1 shows a perspective view illustrating Game Flicz systems in an 'in-use' condition showing a user playing a video game on a video game console according to an embodiment of the present invention.

As discussed above, embodiments of the present invention relate to a video game delivery system for securely providing an internet-based video game catalog available to paying video game playing members for immediate download via a user's personal game console. In referring to the drawings by numeral of reference, there is shown in FIG. 1, Game Flicz systems 100 during 'in-use' condition 150 according to an embodiment of the present invention. As shown, user 140, comprising a video game player, is playing video game 125 via video game console 110 on television 114. In the embodiment of the present invention shown in FIG. 1, video game console 110 comprises a wireless modem for establishing wireless connection 130 over internet 180. User 140 may use video game controller 120 to interact over internet 180 via video game console 110. It should be noted that video game console 110 may comprise any video gaming console comprising an internet connection means. This may include, but is not limited to, Playstation, xBox, Wii, and other systems not expressly stated herein.

Figure 2:
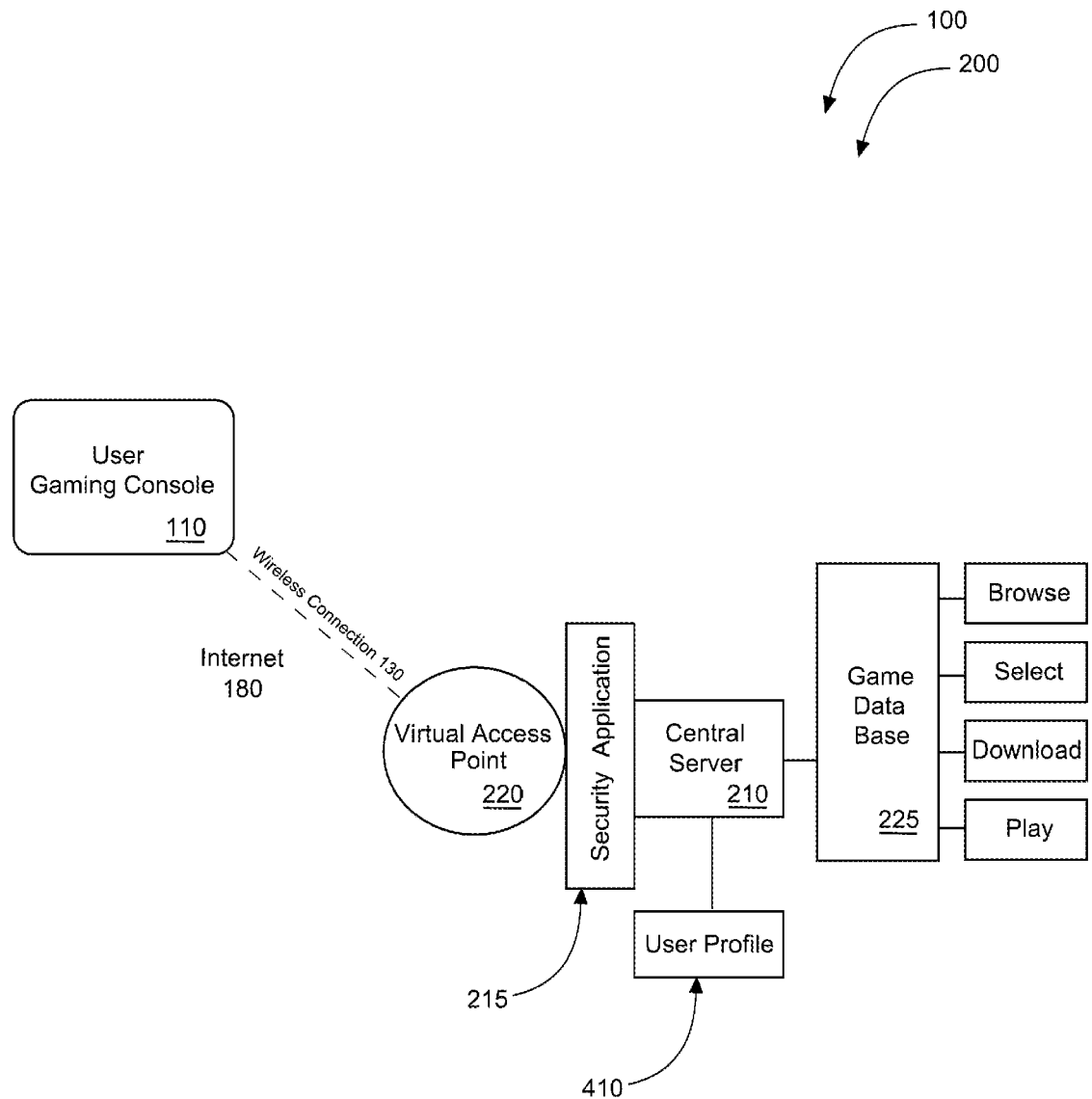
FIG. 2 is a perspective view illustrating a data exchange flowchart of Game Flicz systems according to an embodiment of the present invention of FIG. 1.

In referring now to FIG. 2, illustrating data exchange flowchart 200 of Game Flicz systems 100 according to an embodiment of the present invention of FIG. 1. As illustrated, user 140 may communicate with central game delivery server 210 via video game console 110. In one embodiment of the present invention, central game delivery server 210 may comprise a computer mainframe comprising sufficient processing speed, memory, and a plurality of hard drive units for hosting video game database 225. Central game delivery server 210 may comprise virtual access point 220 for providing portal to video game database 225 securely stored on central game delivery server 210. Central game delivery server 210 may further comprise security application 215. Security application 215 may serve primarily to authenticate user 140 requesting access to video game database 225 via virtual access point 220. Upon authenticating and validating credentials entered by user 140 via video game controller 120, user 140 may gain access to video game database 225 along with membership privileges provided by Game Flicz systems 100.

Video game database 225 may comprise a database of game application files which may be downloaded by user 140 from central game delivery server 210 to video game console 110. Game application files may comprise media files executable program files required by user 140 to successfully run and play video game 125.

In continuing to refer to FIG. 2, once user 140 is preferably authenticated by security application 215, user 140 may gain access to video game database 225 and may select from several options. As shown, user 140 may browse video game database 225, select video game 125, download video game 125 to video game console 110, and play video game 125. It should be noted that video game 125 comprises a plurality of video game execution files required to play video game 125 on video game console 110.

In one embodiment of the present invention, central game delivery server 210 may comprise compression software for compressing game application files of video game 125. In such a manner, game application files may be compressed into a single file for transfer. The compressed file may preferably be encrypted for security. Once the compressed file is received by user 140 via a downloading means from video game database 225, a decompression software application may unlock and decompress game application files into an executable video game 125 playable on video game console 110 of user 140. In an embodiment of the present invention, the compression software may comprise lossy image compression. In an alternative embodiment of the present invention, the compression software may comprise lossless compression algorithms. Lossless data compression comprises a class of data compression algorithms that allows the exact original data to be reconstructed from the compressed data. The term lossless is in contrast to lossy data compression, which only allows an approximation of the original data to be reconstructed, in exchange for better compression rates. Preferably, lossless data compression is utilized by the compression software installed on central game delivery server 210.

In one embodiment of the present invention, video game execution files may comprise a limited usage script which may serve to restrict access to video game 125 by user 140. The limited usage script may enable user 140 to play video game 125 so long as there are no restrictions. Restrictions may include, but are not limited to, parental restrictions, delinquent membership account, abuse of terms of service, and account closure. Preferably, user 140 may only play video game 125 so long as Game Flicz systems 100 membership account is in good standing.

Figure 3:
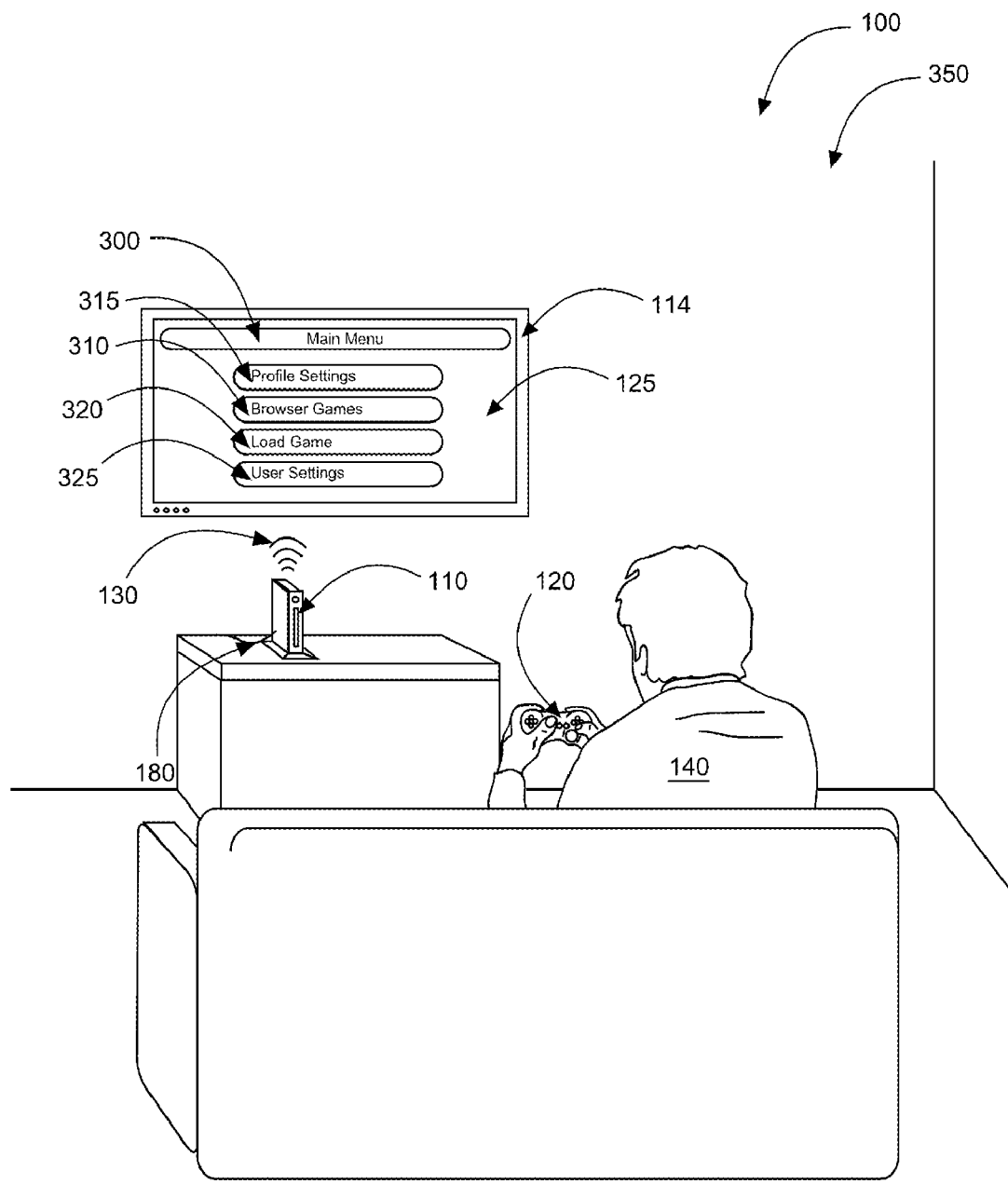
FIG. 3 is a perspective view illustrating the user selecting game playability options once logged into a central game delivery server of Game Flicz systems according to an embodiment of the present invention of FIG. 1.

In turning now to FIG. 3, illustrating Game Flicz systems 100 during 'in-use' condition 350 according to an embodiment of the present invention of FIG. 1, as shown, user 140 may access main menu 300 of Game Flicz systems 100 once user 140 is connected to central game delivery server 210 via video game console 110. Main menu 300 may comprise a plurality of options for accessing and modifying membership privileges. In one embodiment of the present invention as shown in FIG. 3, main menu 300 may comprise options for game catalog 310, profile settings 315, load game 320, and settings 325. Game catalog 310 may comprise a user-friendly, easy-to-browse display of all available video games 125 within video game database 225. Preferably, user 140 may sort through visual thumbnail images of video game 125. The visual thumbnail images of video game 125 may depict a small-sized image of a box cover of video game 125. Alternatively, visual thumbnail images may comprise screen shot images of video game 125. User 140 may click on visual thumbnail image of video game 125 to read a full description of the game, access comments submitted by other members, and to download video game 125 to video game console 110.

It should be noted that video game console 110 simply need only an internet connection means for establishing a secure connection with video game database 225 hosted on central game delivery server 210. Alternative internet connection means may comprise Ethernet cables, external modem, or other including wireless means.

In still referring to FIG. 3, game catalog 310 may further comprise a rating system that user 140 may browse through when selecting video game 125 to download. The rating system may be comprise a plurality of user-submitted ratings, comments, and questions and answers (Q & A) pertaining to video game 125. Consequently, once user 140 logs into either user profile 410 or game catalog 310, user 140 may submit ratings and comments and read other ratings and comments. User 140 may designate whether or not user-submitted comments and ratings may be publicly viewed, viewed only by friends, or private. Furthermore, in one embodiment of the present invention, the rating system may be based on 5 stars (0 stars being the worst rating and 5 stars being the best rating).

Figure 4:
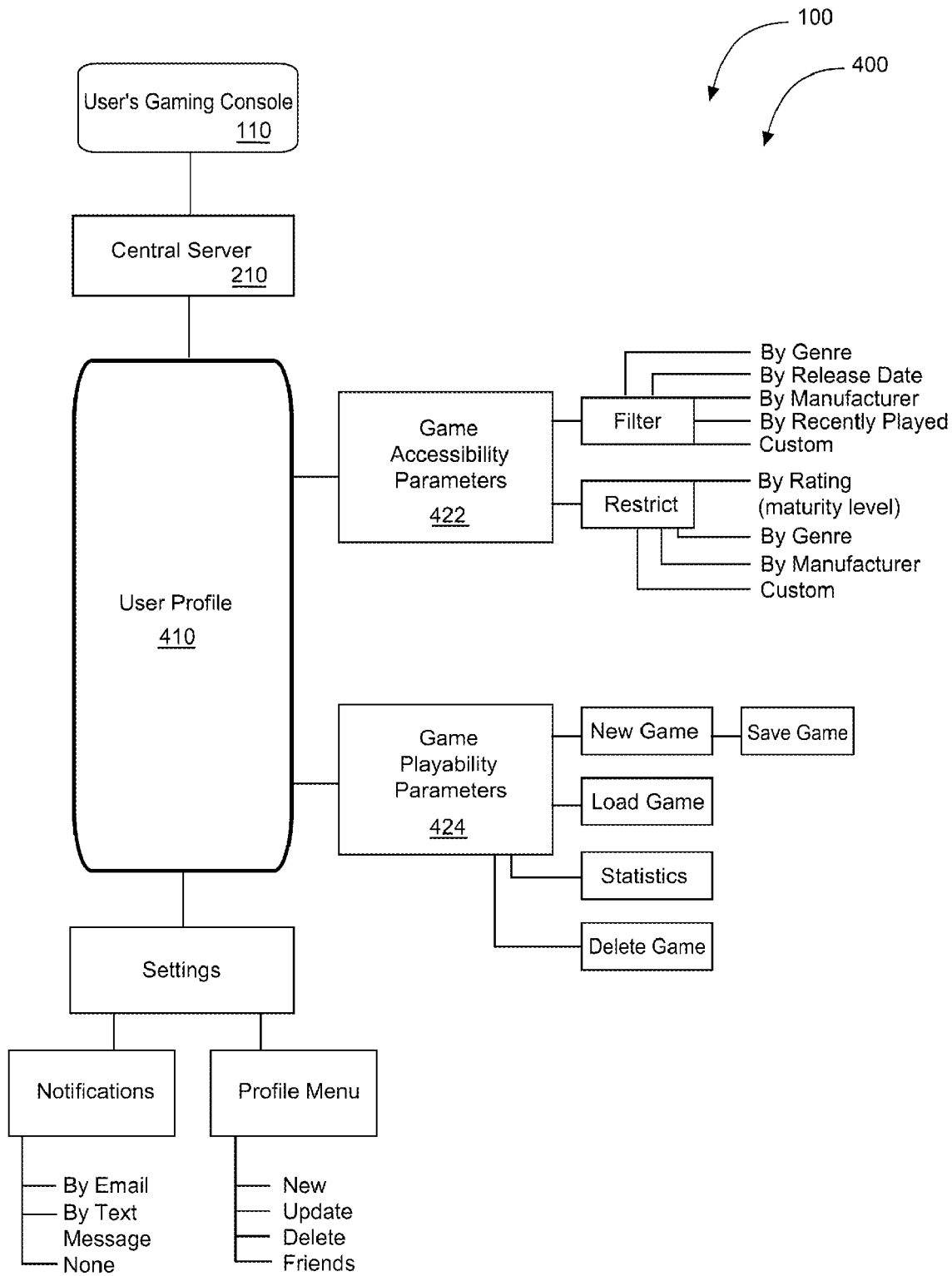
FIG. 4 is a perspective view illustrating a user profile flowchart according to an embodiment of the present invention of FIG. 1.

Turning now to FIG. 4, illustrating user profile flowchart 400 of Game Flicz systems 100. To provide a manner for user 140 to manage his or her membership account on Game Flicz systems 100, user profile 410 may generally comprise user-configurable options for configuring game accessibility parameters 422 and game playability parameters 424. In an exemplary embodiment of Game Flicz systems 100, game accessibility parameters 422 comprise options for the following game accessibility customizations: video game 125 search filters when user 140 is browsing game catalog 310 and types of video games 125 to be restricted from access by user 140.

The video game search filter may comprise a plurality of search filtering options so that user 140 may easily browse video games 125 of his or her liking. Such filter options include, but are not limited to, a search filter by genre (categories of video games 125 traditionally include action, adventure, 3D shooters, role playing games, puzzles, arcade, sports, education, and card & board games), a search filter by release date, a search filter by manufacturer of video games 125, and a search filter based on recently played video games 125 by user 140. Furthermore, it should be noted that user 140 may customize his or her own search filter for performing unique and personalized searches of game catalog 310. It should further be noted that according to a preferred embodiment of the present invention, video games 125 within game catalog 310 are pre-filtered based on the type of video game console 110 owned by user 140. For example, if user 140 owns a Sony Playstation 3 (as shown in FIGS. 1 & 3), only video games 125 playable on the Playstation 3 will appear. In such a manner, user 140 will not be frustrated by sorting through video games 125 that are not playable on video game console 110 used by user 140.

As seen in FIG. 4, user 140 may restrict certain games from appearing in game catalog 310. Video games 125 may be restricted based on the maturity rating of the game, by video game 125 genres, by particular video game manufacturers, or by custom settings. Preferably, in one manner of establishing a restriction, user 140 may enable the restriction of certain video games 125 and may optionally be presented with a means for establishing a secret password for modifying or changing the restrictions. In such a manner, a parent or guardian of user 140 who wishes to restrict the access by user 140 to certain mature rated video games 125 need not worry that user 140 may alter or change the restriction settings to enable access to such content.

In continuing to refer to FIG. 4, game playability parameters 424 may include an option to start a new video game 125, an option to load a saved video game 125, an option to browse collected statistics based on performance by user 140 at various video games 125, and an option to delete a saved video game 125. It should be noted that once user 140 has began playing video game 125, user 140 may save his or her progress via video game controller 120. In one embodiment of the present invention, game playability parameters 424 comprises an auto-save enablement option whereby user 140 may activate this option in order to have video game 125 auto-saved and pre-determined time intervals such that progress is not lost upon an accidental power failure to video game console 110 prior to video game 125 being saved by user 140.

In FIG. 4, user 140 may select settings within user profile 410 to personalize membership options. Such options may include: designation of delivery method of update notification of game catalog 310 options (ie. new video game releases, and membership announcements), modifying user profile 410, adding and removing friends, modifying public information shared to others on user profile 410, and membership account options within Game Flicz systems 100. User 140 may add or modify contact information, address information, and billing information within the settings of user profile 410.

Figure 5:
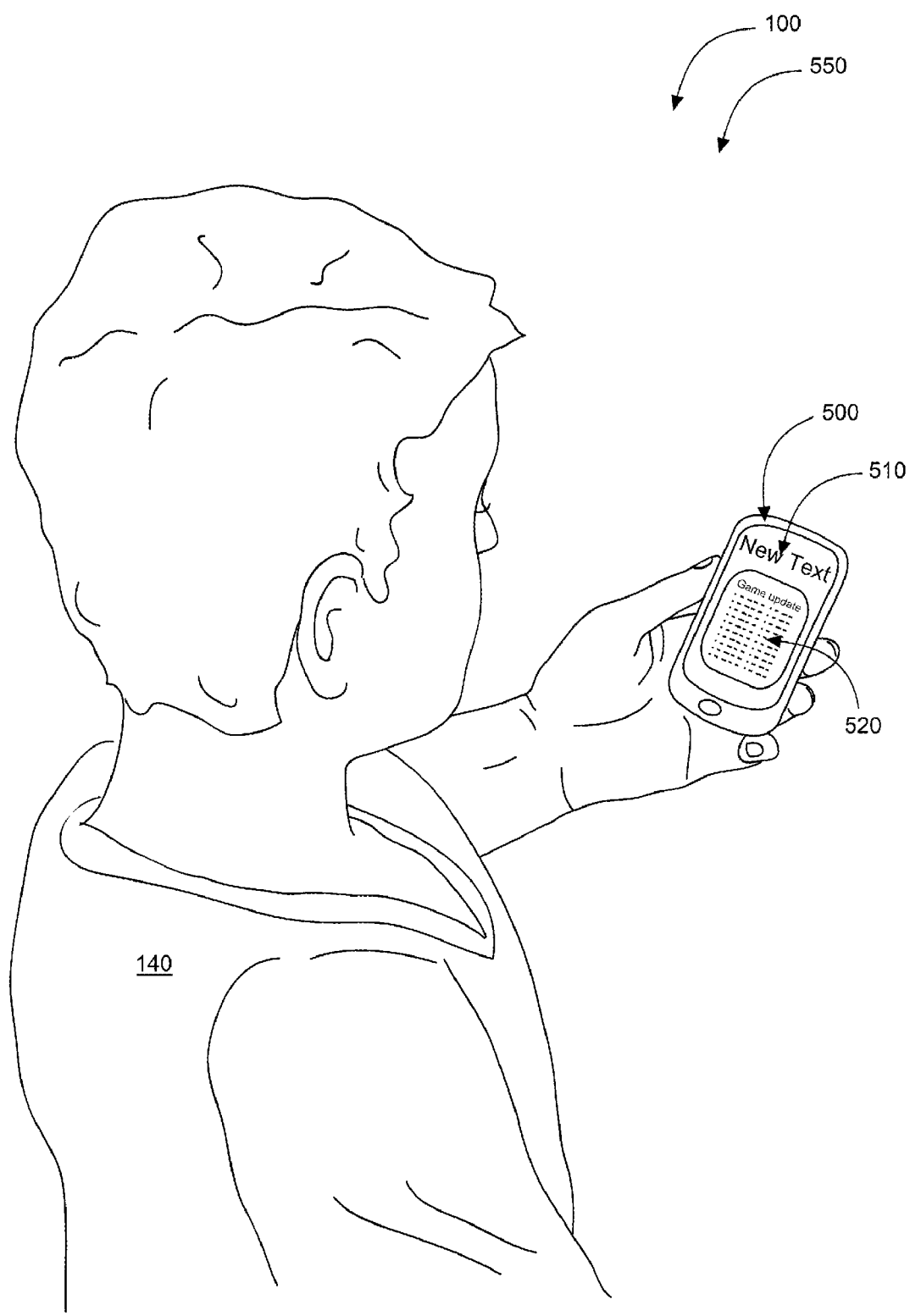
FIG. 5 is a perspective view illustrating the user receiving an update notification of Game Flicz systems via a text message to a mobile phone of the user according to an embodiment of the present invention of FIG. 1.

In referring now to FIG. 5, illustrating Game Flicz systems 100 'in-use' condition 550 according to an embodiment of the present invention of FIG. 1. As shown, central game delivery server 210 of Game Flicz systems 100 may cause user 140 to receive text message 510 on mobile phone 500. Text message 510 may comprise update notification 520 alerting user 140 of new video games 125 that have been added to game catalog 310. Furthermore, text message 510 may comprise important announcements, new friend updates, membership payment notices, and other messages that may be communicated. Alternatively, user 140 may select to receive update notification 520 via email as opposed to via text message 510 on mobile phone 500.

Central game delivery server 210 may comprise a secure notification database storing mobile phone contact information of user 140. In one manner of use, user 140 may configure notification settings within game accessibility parameters 422 of user profile 410. When user 140 designates an option to receive update notification 520 via text message 510, user 140 may be prompted to enter a phone number which has text message capabilities. The phone number entered by user 140 may be communicated to the secure notification database. The secure notification database is in communication with video game database 225 comprising game catalog 310. The secure notification database may comprise an option to automatically transmit update notification 520 via text message 510 when new video game 125 is added to video game database 225. In such a manner, user 140 may be instantly notified when new video game 125 becomes available for play.

Game Flicz systems 100 may comprise a virtual video game delivery system for use with video game console 110 owned and used by user 140 comprising central game delivery server 210, wherein central game delivery server 210 comprises security application 215 for verifying and authenticating membership account information of user 140, and a virtual access point 220 for providing a gateway for user 140 to access video game database 225 hosted on a storage device of central game delivery server 210. Video game database 225 may generally comprise a plurality of video games 125, comprising game application files which may be downloaded from video game database 225 to video game console 110 for enjoyment by user 140. Video game database 225 may be visually represented by way of game catalog 310.

Once connected to central game delivery server 210, user 140 may access main menu 300 and select from a variety of options in order to access game catalog 310. Upon accessing video game database 225, user 140 may browse, select, download, and play a variety of video games 125 which may be compatible with video game console 110 used by user 140. Furthermore, user 140 may configure profile settings 315, as well as define game accessibility parameters 422 and game playability parameters 424 as discussed previously. Game Flicz systems 100 may further comprise data compression software for compressing video game application files. This may enable user 140 to efficiently and expeditiously download video game 125 from video game database 225. Furthermore, the compression software installed on central game delivery server 210 may provide encryption and security against unauthorized access to video game 125.

It should be noted that main menu 300 of Game Flicz systems 100 may comprise an icon for full 1080 HD TV for clearer and sharper graphics. Furthermore, game catalog 310 may comprise a means for downloading and viewing trailers and previews of new video games 125.

Figure 6:
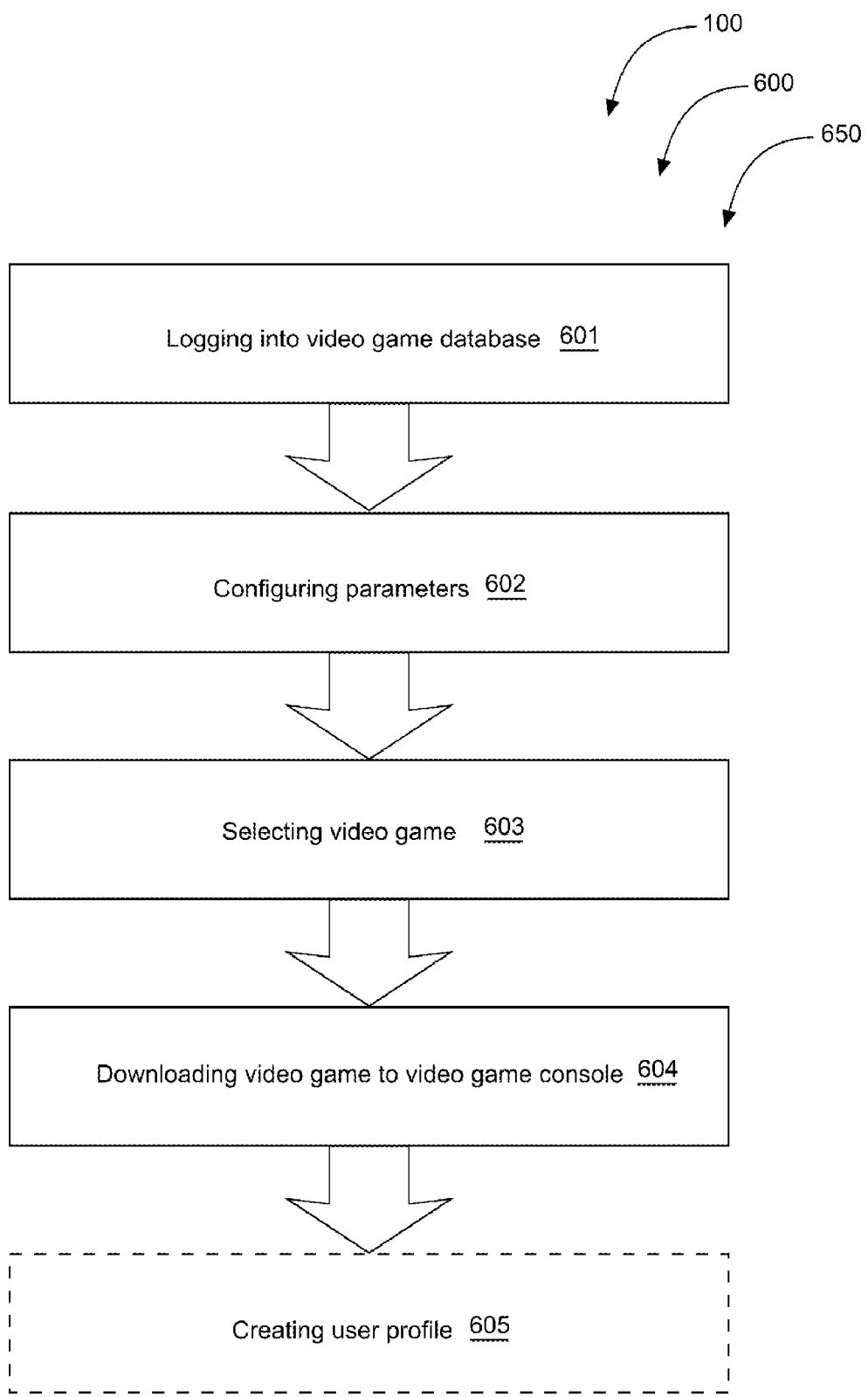
FIG. 6 is a flowchart illustrating a method of use of Game Flicz systems according to an embodiment of the present invention of FIGS. 1-5.

FIG. 6 shows flowchart 650 illustrating method of use 600 of Game Flicz systems 100 according to a preferred embodiment of the present invention of FIGS. 1-5. Method of use 600 may comprise the steps of: step one 601 logging into video game database 225 via video game console 110, step two 602 configuring game accessibility parameters 410 and game playability parameters 420, step three 603 selecting video game 125 from video game database 225 to play, step four 604 downloading video game 125 from central game delivery server 210 to video game console 110, and step five 605 creating user profile 410 for personalizing notification options, parental game restrictions, and loading saved games.

It should be noted that step five 605 is an optional step and may not be implemented in all cases. Optional steps of method of use 600 are illustrated using dotted lines in FIG. 6 so as to distinguish them from the other steps of method of use 600 of Game Flicz systems 100.

It should also be noted that the steps described in the method of use can be carried out in many different orders according to user preference. Upon reading this specification, it should be appreciated that, under appropriate circumstances, considering such issues as design preference, user preferences, marketing preferences, cost, structural requirements, available materials, technological advances, etc., other methods of use arrangements such as, for example, different orders within above-mentioned list, elimination or addition of certain steps, including or excluding certain maintenance steps, etc., may be sufficient.

The embodiments of the invention described herein are exemplary and numerous modifications, variations and rearrangements can be readily envisioned to achieve substantially equivalent results, all of which are intended to be embraced within the spirit and scope of the invention. Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application.

What is claimed is new and desired to be protected by Letters Patent is set forth in the appended claims:

1. A virtual video game delivery system for use with a user's video gaming console comprising;

at least one central server computer comprising a computer processing unit, at least one memory device, and a plurality of virtual access points, said central server computer comprising compression software, said compression software comprising lossy image compression, and said central server computer further comprising a security application;

at least one database of game application files, wherein said game application files are remotely executable on said video gaming console of said user;

at least one set of game accessibility parameters comprising a user authentication system, wherein said user authentication system comprises a method of assigning a unique username and password to said user, thereby enabling said user to access said database of said game application files on said server; wherein said game accessibility parameters comprises an option for restricting accessibility to mature-rated said game application files by said user; and wherein said game accessibility parameters comprises an option for auto-saving game data; and at least one set of game playability parameters, wherein said game accessibility parameters comprises an option for selecting pre-determined categories of said game application files as favorites, and wherein said game accessibility parameters further comprises a message delivery system for delivering messages pertaining to updates of said database to at least one mobile communications device of said user;

wherein said central server computer securely hosts said at least one database of game application files;

wherein said video gaming console of said user wirelessly accesses said server computer vis-à-vis said virtual access points;

wherein said at least one set of game accessibility parameters determines an ability of said user to access said database of game application files within a pre-defined scope of use;

wherein said at least one set of game playability parameters is configurable by said user for restricting and limiting an ability to access and play said game application files of said database; and wherein said video gaming console of said user accesses and downloads said game application files of said database consistent with said game accessibility parameters and said game playability parameters, said game application file useful for playing at least one video game.

\* \* \* \* \*